US010197215B2

(12) United States Patent
Benvenisti

(10) Patent No.: US 10,197,215 B2
(45) Date of Patent: Feb. 5, 2019

(54) INTEGRAL DUAL GIMBAL DEVICE

(71) Applicant: SATIXFY ISRAEL LTD., Rehovot (IL)

(72) Inventor: Leon Benvenisti, Matan (IL)

(73) Assignee: SATIXFY ISRAEL LTD., Rehovot (IL)

( * ) Notice: Subject to any disclaimer, the term of this patent is extended or adjusted under 35 U.S.C. 154(b) by 37 days.

(21) Appl. No.: 15/313,842

(22) PCT Filed: May 13, 2015

(86) PCT No.: PCT/IL2015/000026
§ 371 (c)(1),
(2) Date: Nov. 23, 2016

(87) PCT Pub. No.: WO2015/181809
PCT Pub. Date: Dec. 3, 2015

(65) Prior Publication Data

US 2017/0191605 A1 Jul. 6, 2017

Related U.S. Application Data

(60) Provisional application No. 62/002,869, filed on May 25, 2014.

(51) Int. Cl.

| | |
|---|---|
| ***F16M 11/12*** | (2006.01) |
| ***H01Q 1/12*** | (2006.01) |
| ***H01Q 3/08*** | (2006.01) |
| ***H01Q 19/13*** | (2006.01) |
| ***B64G 1/10*** | (2006.01) |
| ***B64G 1/66*** | (2006.01) |
| ***F16M 11/18*** | (2006.01) |
| ***F16M 13/02*** | (2006.01) |
| ***F16M 11/14*** | (2006.01) |

(52) U.S. Cl.
CPC ........... *F16M 11/12* (2013.01); *B64G 1/1007* (2013.01); *B64G 1/66* (2013.01); *F16M 11/14* (2013.01); *F16M 11/18* (2013.01); *F16M 13/022* (2013.01); *H01Q 1/125* (2013.01); *H01Q 1/1207* (2013.01); *H01Q 3/08* (2013.01); *H01Q 19/13* (2013.01)

(58) Field of Classification Search
CPC ................................ H01Q 1/125; H01Q 3/08
See application file for complete search history.

(56) References Cited

U.S. PATENT DOCUMENTS

| | | | |
|---|---|---|---|
| 2,528,487 | A | 11/1950 | Adkins |
| 2,763,157 | A | 9/1956 | Summers, Jr. |
| 3,638,502 | A | 2/1972 | Leavitt et al. |
| 4,068,538 | A | 1/1978 | Butler et al. |
| 4,490,724 | A | 12/1984 | Bickman |

(Continued)

FOREIGN PATENT DOCUMENTS

| | | | |
|---|---|---|---|
| CN | 103261711 | A | 8/2013 |
| EP | 2650962 | A1 | 10/2013 |

*Primary Examiner* — Graham Smith
(74) *Attorney, Agent, or Firm* — Browdy and Neimark, PLLC

(57) ABSTRACT

A device comprising a single element which includes two integrally connected gimbals for use in satellite communications, wherein the device is characterized in being capable of performing two rotational movements around two axes that are orthogonal to each other.

3 Claims, 4 Drawing Sheets

(56) References Cited

U.S. PATENT DOCUMENTS

| | | | | |
|---|---|---|---|---|
| 4,628,725 | A | 12/1986 | Gouilloud et al. | |
| 4,628,765 | A | 12/1986 | Dien et al. | |
| 6,285,339 | B1 * | 9/2001 | McGill | F16M 11/10 248/278.1 |
| 2007/0241244 | A1 | 10/2007 | Tavassoli Hozouri | |
| 2014/0094310 | A1 | 4/2014 | Bleich et al. | |
| 2014/0147193 | A1 | 5/2014 | Baudasse | |

* cited by examiner

INTEGRAL DUAL GIMBAL DEVICE

TECHNICAL FIELD

The present disclosure relates to the field of satellite communications and more specifically to a device that enables tracking satellite's movements.

BACKGROUND

The demand for higher communication throughput and at the same time for a lower communication bandwidth cost is ever increasing. In the recent years more Medium Earth Orbit ("MEO") and Low Earth Orbit ("LEO") communication satellites are being launched or under planning. A LEO is an orbit around Earth with an altitude between 160 kilometers, with an orbital period of about 88 minutes, and 2,000 kilometers with an orbital period of about 127 minutes, whereas a MEO satellite is one having an orbit within the. range from a few hundred miles to a few thousand miles above the earth's surface, below geostationary orbit (altitude of 35,786 kilometers).

Another type of platforms being used is a High-Altitude Platform ("HAP") which is a quasi-stationary aircraft that provides means of delivering a service to a large area while remaining in the air at an altitude of 10-14 miles, for long periods of time.

Unfortunately, only the fastest and most expensive azimuth-elevation pedestals used in the industry are capable of continuously tracking satellites on high elevation passes. The problem occurs typically when the satellite approaches or departs from its highest elevation. At this point, the pedestal must carry out high speed azimuth movements under high acceleration forces in order to track the satellite while insufficient azimuth speed results in the earth station being unable to track the satellite continuously for passes that exceed a certain maximum elevation. Several methods have been suggested in the past in order to overcome this problem, including trajectory optimization where the antenna trajectory is modified to minimize antenna pointing losses on or near zenith passes:

1. Elevation over Azimuth Pedestal—(illustrated in FIG. 1) in such cases the azimuthal speed is usually the limiting factor that prevents zenith tracking of a LEO satellite, therefore it is not suitable for communications with LEO satellites; and
2. Elevation over Azimuth over Tilt Pedestal—(illustrated in FIG. 2) in such cases the third axis provides the ability of zenith tracking, but as this solution dictates the use of three motors, it increases the mass, volume and cost associated with such a station.

SUMMARY OF THE DISCLOSURE

It is an object of the present disclosure to provide a device for tracking satellites.

It is another object of the present disclosure to provide a device that overcomes problems associated with tracking satellites when they approach or depart to/from their highest elevation.

It is yet another object of the present disclosure to provide a device that is suitable for zenith tracking of space as well as very high altitude borne platforms, such as LEO, MEO and HAP without substantially increasing the mass, volume and cost associated with such a device.

Other objects of the invention will become apparent as the description of the invention proceeds.

The present invention provides a device comprising a single element which includes two integrally connected gimbals, wherein the device is capable of performing two simultaneous rotational movements, each around a different axis, and wherein the two axes are orthogonal to each other. Examples of such a single element are illustrated in FIG. 3 presenting a Vertical over Horizontal Pedestal, i.e. a pedestal that has two orthogonally connected gimbals. This configuration allows the pedestal to provide zenith pass tracking with the use of only 2 relatively low speed motors.

According to another embodiment there is provided a device for use in satellite communications, which includes:

support means;

a first gimbal, rotatably mounted on the support means for rotation about a first axis;

a second gimbal, rotatably mounted on the support means for rotation about a second axis being substantially perpendicular to the first axis; and two motors, each associated with another of the first and second gimbals and configured to provide rotational movements to the gimbal associated therewith;

wherein the first and second gimbals are integrally connected gimbals, and wherein said device is characterized in being capable of performing two rotational independent movements around two axes that are orthogonal to each other.

The term "gimbal" as used herein throughout the specification and claims is used to denote a pivoted support that allows rotation of an object about a single axis. The term "integrally connected gimbals" as used herein throughout the specification and claims is used to denote an arrangement that comprises a pivoted support e.g. a sphere, around which the antenna and the enclosure moves in both axes, i.e. a pivoted support which is common to both axes.

Preferably, the device further comprises motors, at least one PCB and bearings and is installed in a sealed enclosure. Therefore, this enclosure may be used as a means to provide two rotational movements in axes that are orthogonal to each other. These rotational movements may be implemented at different tracking and scanning systems.

According to another embodiment of the invention, the device provided is further adapted to perform a rotational movement around at least one of the two orthogonal axes of less than a 360° of a rotational movement, said device comprising one or more torsion springs configured to eliminate possible backlashes in a gear of a motor operative to enable the less than a 360° rotational movement around the at least one of the two orthogonal axes.

BRIEF DESCRIPTION OF THE DRAWINGS

For a more complete understanding of the present invention, reference is now being made to the following detailed description taken in conjunction with the accompanying drawings wherein:

FIG. 4A illustrates an upward view taken from the bottom of the sealed enclosure, whereas FIG. 4B illustrates a downwardly view of a sealed enclosure of that device. FIG. 4C illustrates RF components included in a device disclosed according to an embodiment of the present invention;

DETAILED DESCRIPTION

In the present disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the present invention. It should be apparent, however, that the present invention may be practiced without these specific details.

The present invention provides an integral gimbal device which comprises a single element which is capable of performing two rotations in axis that are perpendicular to each other. The integral gimbal device is easy to manufacture, saves volume and can be fully sealed for outdoor use.

Also, the integral gimbal device has a considerable advantage during installation as it requires a simple mounting (only one mounting screw is required) which in turn saves installation time and money.

In addition, the integral gimbal device is easily scalable and can therefore be easily fitted to different systems—size and movement.

Figure 1:
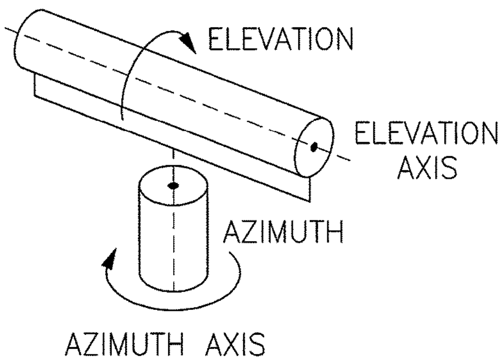
FIG. 1 illustrates a prior art solution of an Elevation over Azimuth Pedestal.
Figure 2:
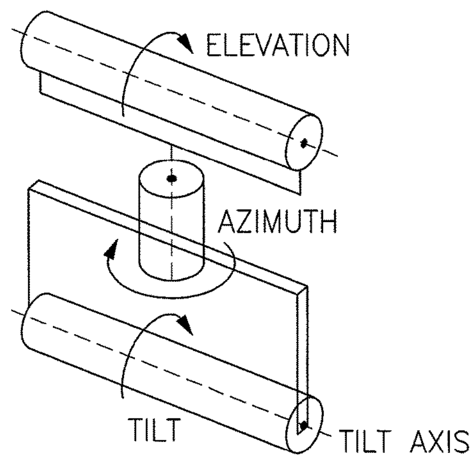
FIG. 2 illustrates another prior art solution of an Elevation over Azimuth over Tilt Pedestal.
Figure 3:
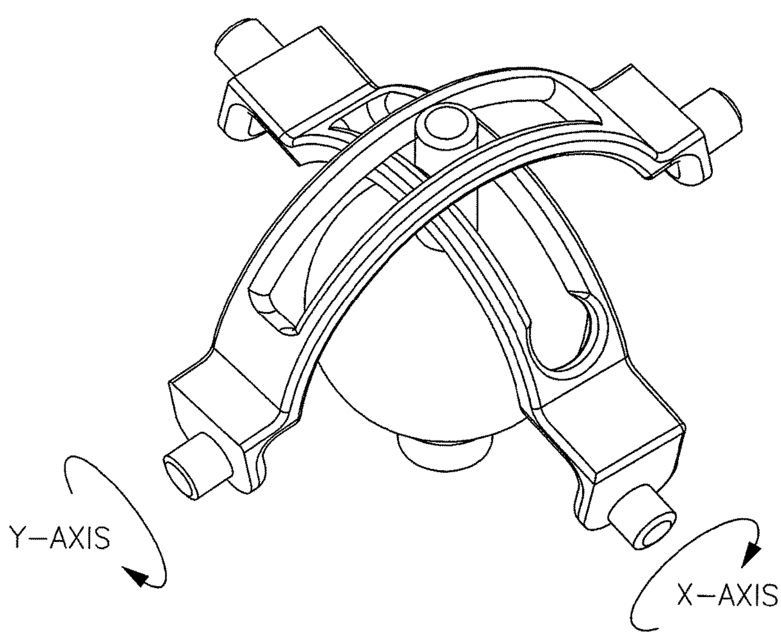
FIG. 3 demonstrates a simultaneously operating Vertical over Horizontal pedestal according to an embodiment of the present disclosure which has two unconnected orthogonal axes which provides an optimal tracking capabilities for up to ±45° rotational tracking.

According to an embodiment of the present invention there is provided a device which is exemplified in FIG. 3 which has two unconnected orthogonal axes that provides an optimal tracking capabilities for up to ±45° rotational tracking.

Figure 4A:
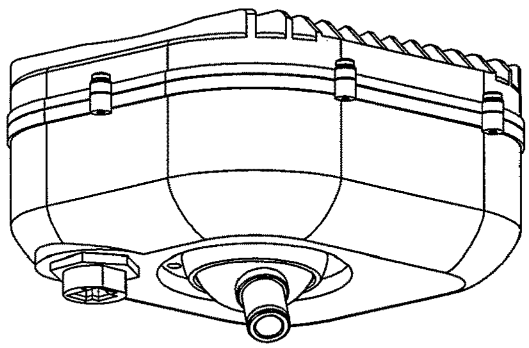
FIG. 4A to FIG. 4C illustrate another embodiment of the disclosure of a single element that is able to provide simultaneous rotational movements in both the vertical and horizontal connected gimbals.
Figure 4B:
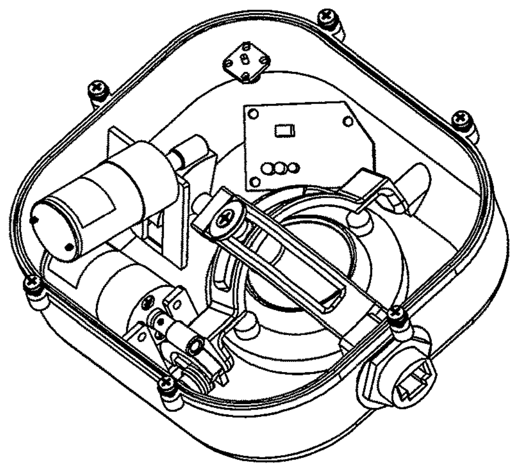
Figure 4C:
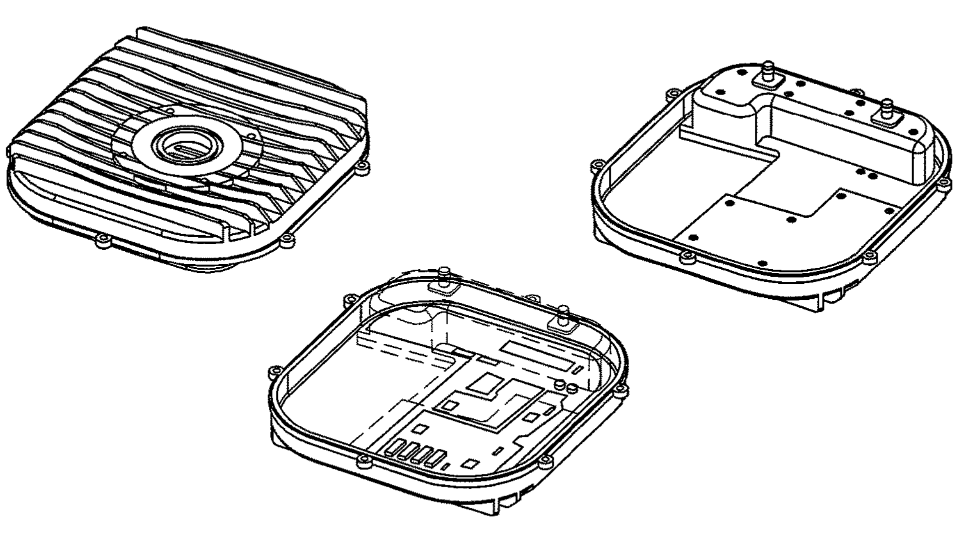

FIG. 4A and FIG. 4B illustrate another embodiment of the disclosure of a single element that is able to provide simultaneous rotational movement in both the vertical and horizontal connected gimbals. FIG. 4A illustrates an upward view taken from the bottom of the sealed enclosure, whereas FIG. 4B illustrates a downwardly view taken from above the sealed enclosure. The configuration illustrated in FIGS. 4A and 4B when taken together is of a fully sealed box with two worm gears. This configuration may be used for achieving rotational movements of up to ±45° in both axis (vertical and horizontal), and once again, two torsional springs may be used to eliminate the unwanted backlash phenomenon. FIG. 4C illustrates RF components included in a device disclosed according to this embodiment.

FIG. 4C comprises three top views of the enclosure illustrated in FIG. 4A. The first view demonstrates the external envelop of the enclosure including ribs that support the reflector of the antenna. The second view is of the internal side of the enclosure, illustrating inner components such as connectors and inner covers and the third view is somewhat similar to the previous view.

Figure 5:
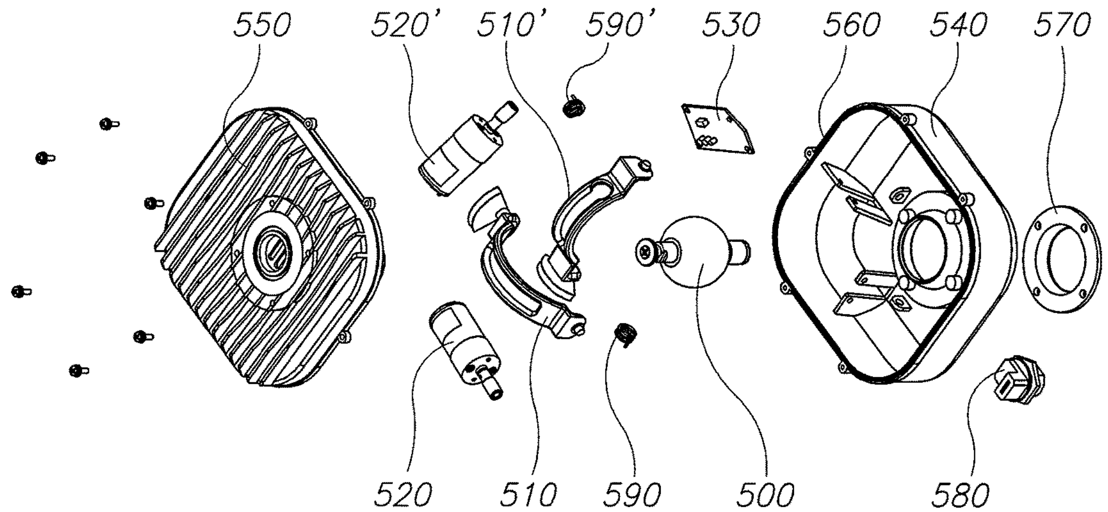
FIG. 5 illustrates an exploded view of a device such as the one presented in FIG. 4.

FIG. 5 illustrates an exploded view of the device exemplified in FIGS. 4A and 4B. The device illustrated in this example comprises the following components: a main element (500), two gimbals (510, 510'), two motors (520 and 520'), a printed circuit board, PCB (530), a lower cover (540), an upper cover (550), a seal (560), a ball cover (570), a connector (580) and two torsion springs (590 and 590').

Figure 6:
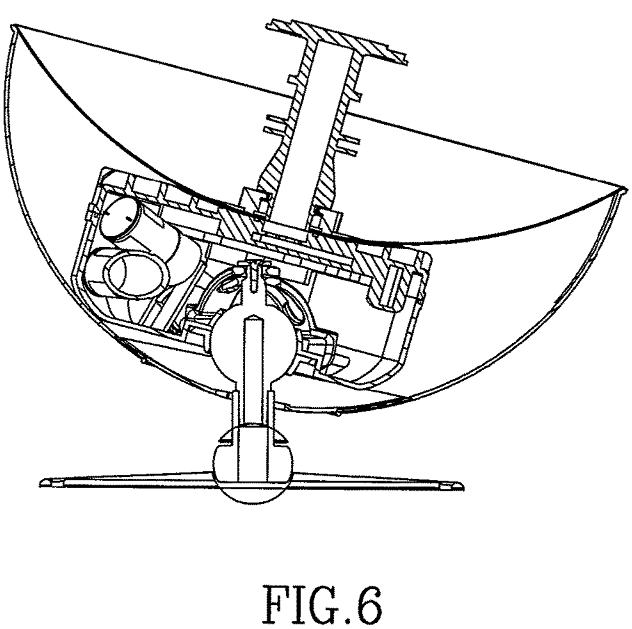
FIG. 6 demonstrates an embodiment where the device presented in FIG. 5 is used for satellite communications.

FIG. 6 demonstrates an embodiment where the device presented in FIG. 5, an integral gimbal device configured to carry out simultaneously two rotational movements, is used for satellite communications.

As may be seen in FIGS. 3 to 6, the present invention relies on the use of single element, which can simultaneously rotate in two perpendicular axis. This main element, when taken together with motors, PCB, bearings and axis is preferably contained in a sealed box which is configured to provide two perpendicularly rotation movements. These movements may be used in different tracking and scanning systems. Simple torsion springs may optionally be used to eliminate backlashes from occurring in the motors' gears. By following the concept of the present invention, there is no need for having continuously rotation in any direction. Thus motors may be static in the sealed box, and consequently there is no need for slip-rings and/or rotary joints for connection.

Figure 7:
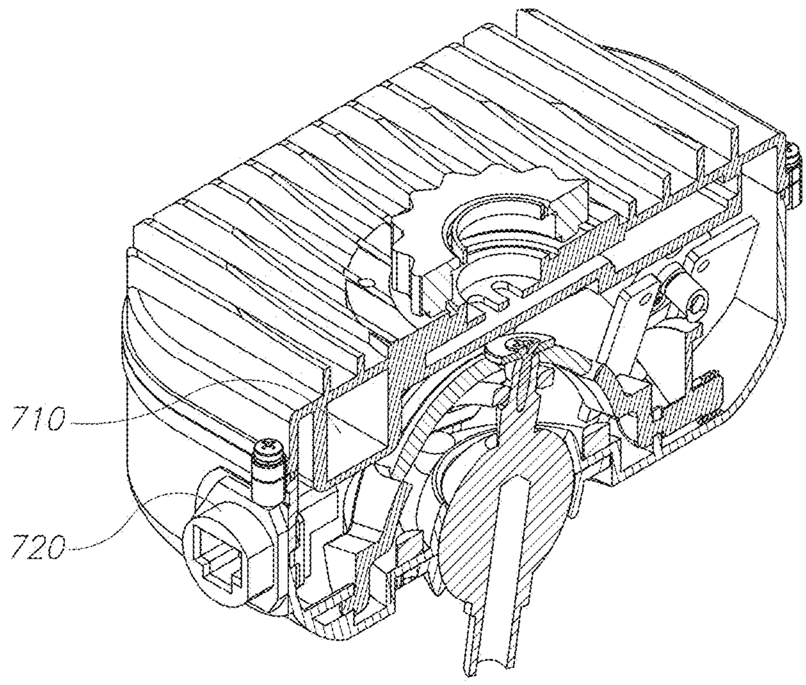
FIG. 7 illustrates an embodiment of the present disclosure where the active elements of the exemplified device are comprised within the device's envelop.

The active elements (RF amplifiers, LNB, etc . . . ) illustrated in the example presented in FIG. 7 (elements 710) may be comprised within the device's envelop (e.g. within the sealed box), in which case there is and no need for any cables, rotary joints and waveguides. This device provides a simple, cheap and very reliable solution to the problem which the present invention seeks to solve. Also illustrated in the FIG. is a single connector which is used to connect the device to the antenna (720).

Figure 8A:
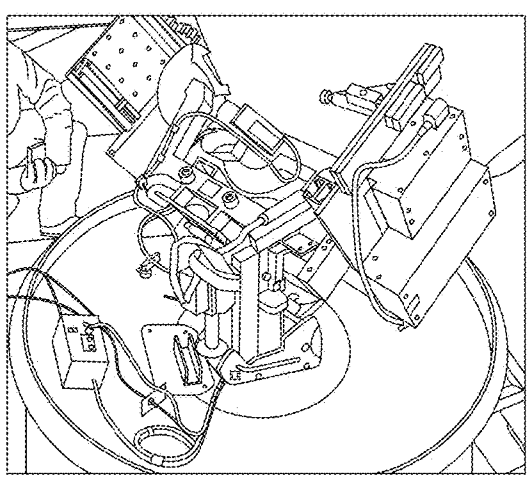
FIG. 8A and FIG. 8B demonstrate a comparison between an antenna constructed in accordance with prior art solutions and an antenna comprising the single element as provided by the present invention.
Figure 8B:
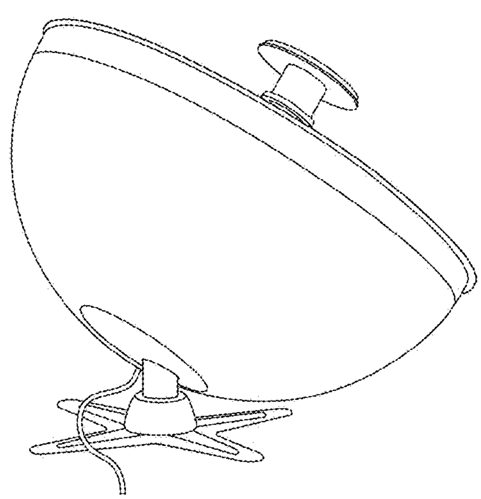

FIGS. 8A and 8B demonstrate a comparison between an antenna constructed in accordance with prior art solutions (FIG. 8A) which comprises a three motors arrangement, a waveguide rotary joint, a slip ring a large number of cables to enable powering the three motors arrangement. FIG. 8B on the other hand, illustrates an antenna comprising the single element as provided by an embodiment of the present invention, having a single ingressing cable that allows providing power over the Ethernet to the antenna.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A detachable sealed box for use in conjunction with an antenna structure to enable satellite/HAP communications, wherein said detachable sealed box comprises:

two motors, each associated with gimbals comprised in said antenna structure, wherein said two gimbals are substantially perpendicular to each other, and wherein each of said two motors is configured to provide rotational movements to the gimbal associated therewith;

RF elements;

Printed Circuit Boards (PCBs):

an electrical connector; and a controller; and wherein said detachable sealed box is configured to be mounted onto said antenna structure and be connected thereto by a main element configured to mechanically connect said detachable sealed box to the antenna structure;

wherein the two gimbals are integrally connected gimbals having a pivoted support which is common to both axes; and wherein upon connecting said detachable sealed box to said antenna structure, said combination is configured to perform two rotational independent movements around two axes that are orthogonal to each other.

2. The device of claim 1, further adapted to perform a rotational movement around at least one of the two orthogonal axes of less than a 360° of a rotational movement, said device comprising one or more torsion springs configured to eliminate possible backlashes in a gear of a motor operative to enable the less than a 360° rotational movement around the at least one of the two orthogonal axes.

3. The device of claim 1, wherein the rotational movements are of up to ±45° in both vertical and horizontal axes.

* * * * *